Nov. 4, 1941.   B. J. SELHORST   2,261,666
COMBINATION AGRICULTURAL IMPLEMENT
Filed Jan. 27, 1941   2 Sheets-Sheet 1
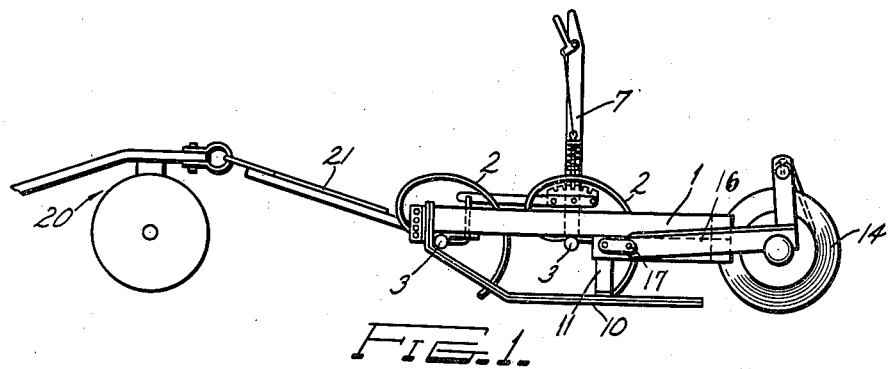
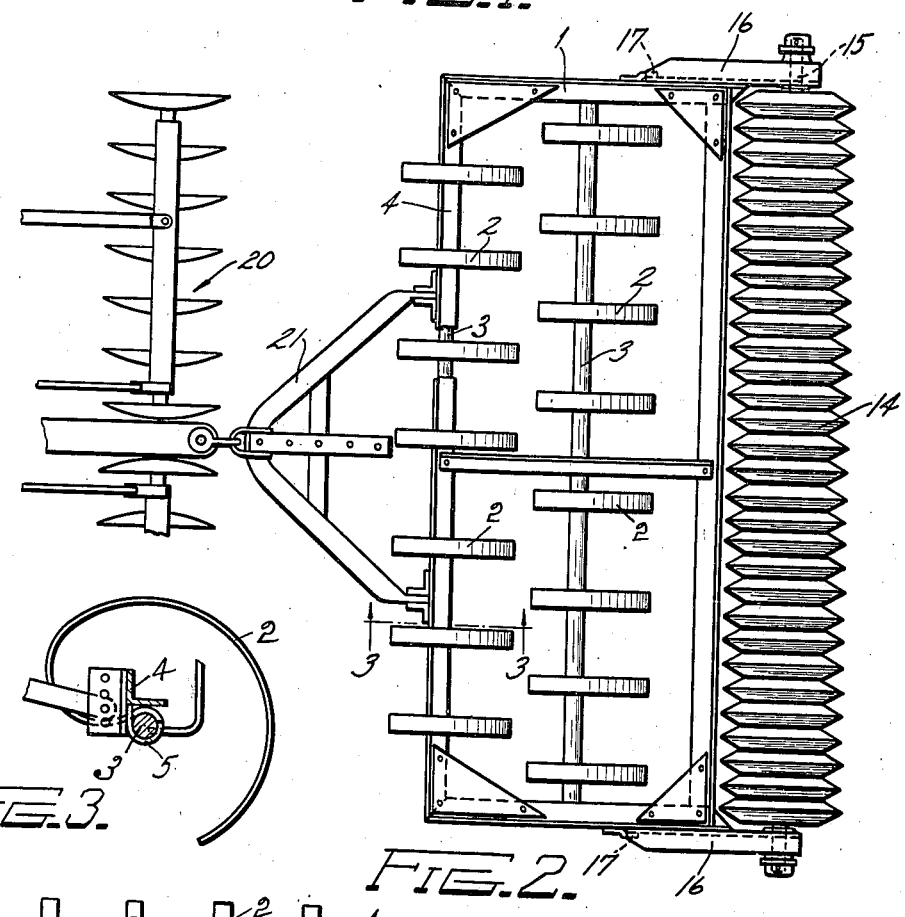
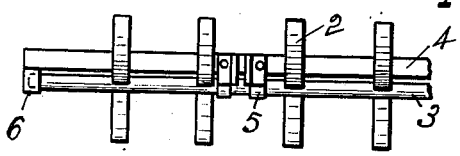
Inventor
BERNARD J. SELHORST
By Owen & Owen
Attorneys.

Nov. 4, 1941.  B. J. SELHORST  2,261,666
COMBINATION AGRICULTURAL IMPLEMENT
Filed Jan. 27, 1941    2 Sheets-Sheet 2

Inventor
BERNARD J. SELHORST
By Owen & Owen,
Attorneys

Patented Nov. 4, 1941

2,261,666

UNITED STATES PATENT OFFICE 2,261,666

COMBINATION AGRICULTURAL IMPLEMENT

Bernard J. Selhorst, Coldwater, Ohio

Application January 27, 1941, Serial No. 376,130

2 Claims. (Cl. 55—12)

This invention relates to farm implements for use in pulverizing and packing the soil preparatory to seeding, and has particular reference to a combination implement of this character.

An object of the invention is the provision in combination of a toothed harrow and one or more rotary packers arranged in tandem and compactly associated to facilitate turning in a comparatively small space, the several units at the same time being adapted for relative vertical movements as irregular ground is traversed without causing an objectionable digging in or raising of the harrow teeth in front or rear of the harrow as a roller passes over a stone or elevation or drops into a depression.

Other objects and advantages of the invention will be apparent from the following detailed description, and from the accompanying drawings illustrating the invention, in which—

Figure 5:
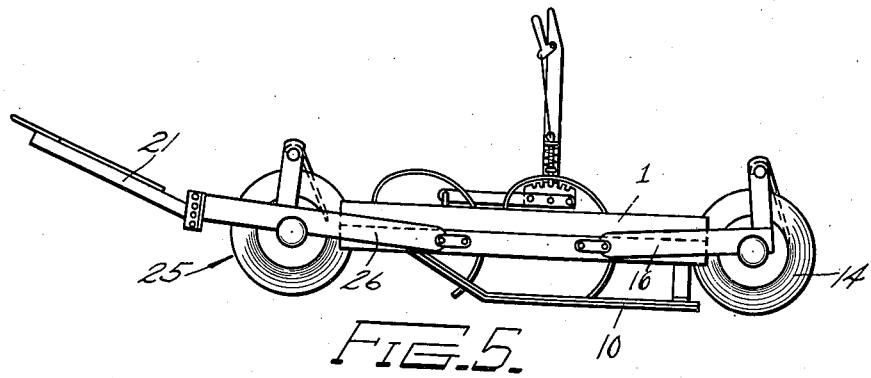
Figure 6:
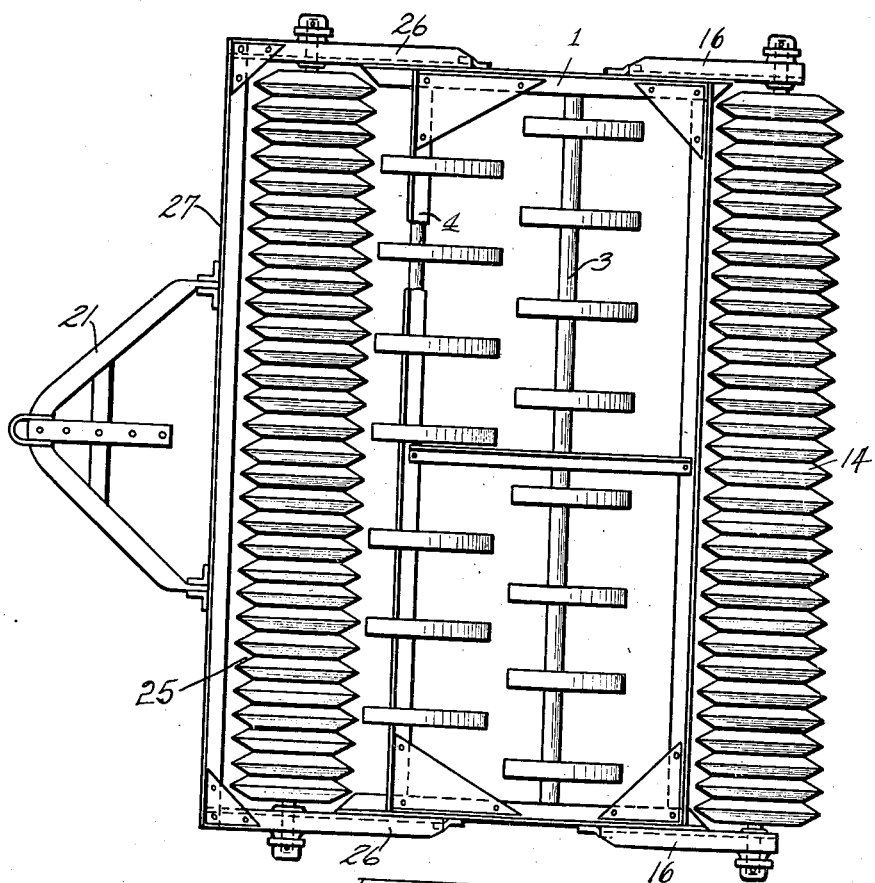

Figure 1 is a side elevation of an implement embodying the invention attached to a disk harrow; Fig. 2 is a top plan view of Fig. 1, with parts removed and parts broken away; Fig. 3 is an enlarged section on the line 3—3 in Fig. 2; Fig. 4 is a fragmentary front elevation of the spring harrow, with parts in section; Fig. 5 is a side elevation of the implement, with packing rollers or disks at the front and rear of the harrow frame, and Fig. 6 is a plan view thereof.

Referring to the drawings, I designates a harrow frame of rectangular form and carrying a plurality of rows of harrow teeth, in the present instance of the spring type. This frame is comparatively short lengthwise thereof or from front to rear, and in the present instance carries two transverse rows of spring harrow teeth 2 with the teeth of each row attached at their inner or upper ends to a respective cross shaft 3, which is journaled at its ends in suitable bearings attached to the frame ends.

In order to place the front row of harrow teeth as close to the front end of the frame as possible, and thus to enable a lengthwise shortening of the frame to accommodate the two rows of teeth, the shaft 3 of the front row is mounted under the front frame bar 4 of the frame on brackets 5 suspended therefrom and at its ends in bearings 6 suspended from the end portions of such bar, as best shown in Figs. 3 and 4. The spring harrow teeth 2 of the front row are fixedly attached at their inner or upper ends to the front shaft 3 and extend forwardly therefrom under the front cross-bar 4 of the frame and thence in a curve upwardly, rearwardly and downwardly with the free ends thereof extending forwardly and terminating a distance below the shaft to adapt them to have raking engagement with the soil over which the harrow may be operated. The shafts are connected, in any suitable or well-known manner, to a control lever 7, a rocking of which effects a rocking of the shafts and a raising or lowering of the soil engaging ends of the teeth relative to the frame, as well understood in the art.

The harrow frame I is supported at its ends by runners 10, which have their forward ends inclined upwardly and attached to the front end of the frame, while the rear ends of their straight soil engaging portions extend a distance beyond the rear row of harrow teeth 2, and in the present instance substantially to the rear end of the frame. The straight soil engaging portions of the runners 10 are parallel to the frame I and held in spaced relation thereto by standards 11 in connection with the front upwardly extending frame attaching ends of the runners. The extending of the runners 10 to the rear of the last row of harrow teeth 2 is an important feature in the operation of the combination implement, as will hereinafter be more fully described.

A roller 14, in the present instance of the corrugated type known as a "cultipacker," pivotally trails from the harrow frame I for vertical movements relative thereto. For draft purposes, each end of the roller shaft 14 has a frame arm 16 projecting forwardly therefrom in side lapping relation to the frame I and pivotally attached at its forward end to the respective side bar of the frame as indicated at 17. The pivots 17 are located in axial alignment a distance forwardly of the rear end of the frame I and also forwardly of the rear ends of the runners 10 and adjacent to the rear harrow tooth shaft 3 at the rear thereof, substantially as indicated in the drawings. The roller 14 is disposed in quite close relation to the harrow frame I, so as to provide a close coupling between the two, which is desirable for turning and easy handling of the implement. While the roller 14, however, is in close coupled relation to the harrow frame, the pivoting of its arms 16 to the frame, adjacent to its center or a distance forward of its rear end, provides a radius of considerable length for the vertical arcuate movements of the roller axis relative to the frame occasioned by the passage of the implement over uneven surfaces.

It is found in practice that the terminating of the runners 10 near the rear end of the harrow frame, or at least rearwardly of the rear row of harrow teeth, and the pivoting of the roller arms to the harrow frame in advance of the rear ends of the runners, as well as a distance forward from the rear end of the harrow frame, are important factors in an efficient and satisfactory operation of the implement.

The tendency of the runners 10 is to maintain the harrow frame in substantially level position should the roller 14 lower or raise relative to the frame due to dropping into a depression or passing over a stone or other elevation in the surface over which operating. It is found that if the runners 10 terminate short of the rear row of harrow teeth 2, or if the point of pivotal connection of the roller frame arm 16 to the harrow frame is rearwardly of the harrow teeth or at the rear end of the frame 1 in rather close relation to the axis of the roll, the roller unit, when dropping into a depression, has a tendency to lower the rear end of the harrow frame therewith and cause a digging or nosing-in of the rear row of teeth and at the same time to effect a consequent raising of the front row of teeth from the soil. It is also found, under such conditions, that if the roller unit passes over a stone or other abrupt elevation, it causes a raising of the rear end of the harrow frame and a consequent raising of the rear row of teeth from the soil and a digging or nosing-in of the front row of teeth. These objectionable features are also present when the packing roller is mounted in the frame with the harrow teeth so that the roller unit is not permitted to have vertical pivotal movements relative to the harrow frame.

It is found that in a combination implement of this character, the arrangement of parts and connecting of the harrow and roller units, substantially as shown in the drawings, avoid the objections above-noted and enhance the practicability and commercial value of such implements.

In the present instance, the combination implement described is shown as trailing from a disk harrow unit 20 through a suitable draft connection 21.

If desired, the combination harrow and packer implement above-described may have a roller type packer unit 25 attached to the forward end of the harrow frame in the same manner that the packer unit 14 is attached to the rear end of the harrow frame, namely, by having the roller of the unit 25 disposed in close relation to the forward end of the harrow frame with its side frame arms 26 pivoted to the sides of the harrow frame a distance rearwardly of the front harrow tooth shaft and also rearwardly of the front end of the harrow supporting runners. With this arrangement, the draft means 21 is connected to a front cross-bar 27 of the front roller unit frame instead of to the front cross-bar of the harrow frame.

I wish it understood that my invention is not limited to any specific construction, arrangement or form of the parts, as it is capable of numerous modifications and changes without departing from the spirit of the claims.

Having thus described my invention, what I claim as new and desire to secure by United States Letters Patent is:

1. In a combination implement comprising closely coupled toothed harrow and packing roller units with the latter trailing the former, said harrow unit having a frame with a front cross member and side members, runners disposed below the side members of the frame and supporting the frame, said runners commencing at substantially the front end of the frame and extending rearwardly to a point near the rear end of the frame, a plurality of cross rows of spring harrow teeth carried by the frame, with the front row adjacent to the front end of the frame and with the rear row spaced forwardly from the rear end of the frame and also from the rear end of said runners, said roller unit having draft arms projecting forward from its ends at the respective sides of the harrow frame with the arms pivoted thereto at their forward ends for vertical rocking movements relative to said frame, the points of pivotal connection of said arms being adjacent to the rear set of harrow teeth and in advance of the rear ends of said runners.

2. In a combination implement comprising a spring toothed harrow unit and a packer roller unit at both the forward and rear ends of said harrow unit, said harrow unit having tooth carrying frame side members and a supporting runner beneath each side member and attached to the frame, said runners being substantially coextensive in length with the harrow frame the rear roller unit having a roller in close relation to the adjacent end of the harrow frame and provided with end trunnions, an arm pivotally projecting from each trunnion and lapping the respective side of the frame with its free end pivotally connected to the frame to permit vertical rocking movements of the arm relative to the frame, said points of pivotal connection being spaced inwardly from the adjacent end of the harrow frame and disposed intermediate the ends of the runners.

BERNARD J. SELHORST.